United States Patent [19]

Goodman et al.

[11] 3,783,639

[45] Jan. 8, 1974

[54] RESILIENT JOINT

[75] Inventors: Derek J. Goodman, Ingersoll, Ontario; Gerald N. Farr, Woodstock, Ontario, both of Canada

[73] Assignee: Ingersoll Machine and Tool Company Limited, Ingersoll, Ontario, Canada

[22] Filed: June 21, 1972

[21] Appl. No.: 264,742

[52] U.S. Cl. ............ 64/27 NM, 64/11, 64/14, 267/21, 267/57.1
[51] Int. Cl. ............................................. F16d 3/14
[58] Field of Search .......... 64/14, 27 R, 27 NM, 64/11; 267/57.1, 21

[56] References Cited
UNITED STATES PATENTS

| 3,436,069 | 4/1969 | Henschen | 64/27 R |
| 2,388,450 | 11/1945 | Thompson | 64/27 NM |
| 2,712,742 | 7/1955 | Neidhart | 64/14 |
| 2,729,442 | 1/1956 | Neidhart | 64/14 |
| 3,482,464 | 12/1969 | Reisch et al. | 64/27 NM |

*Primary Examiner*—Charles J. Myhre
*Assistant Examiner*—Randall Heald
*Attorney*—Alan Swabey

[57] ABSTRACT

An elastic joint of the type using interposed elastomeric springs for resiliently restraining against relative rotation an outer tubular member and an inner polygonal member connected to a torsion arm and means for connecting the inner and outer members in relative rotational relationship while maintaining their coaxial alignment. The connecting means is in the form of a cup provided with an inner cylindrical pocket rotatably containing a ring with a polygonal bore fitting about the inner member and an outer socket non-rotatably receiving the end of the outer member. The joint is assembled by sliding the cup and ring over the inner member followed by sliding the outer member and rubber springs over the inner member until the end of the outer member is received in the socket.

5 Claims, 3 Drawing Figures

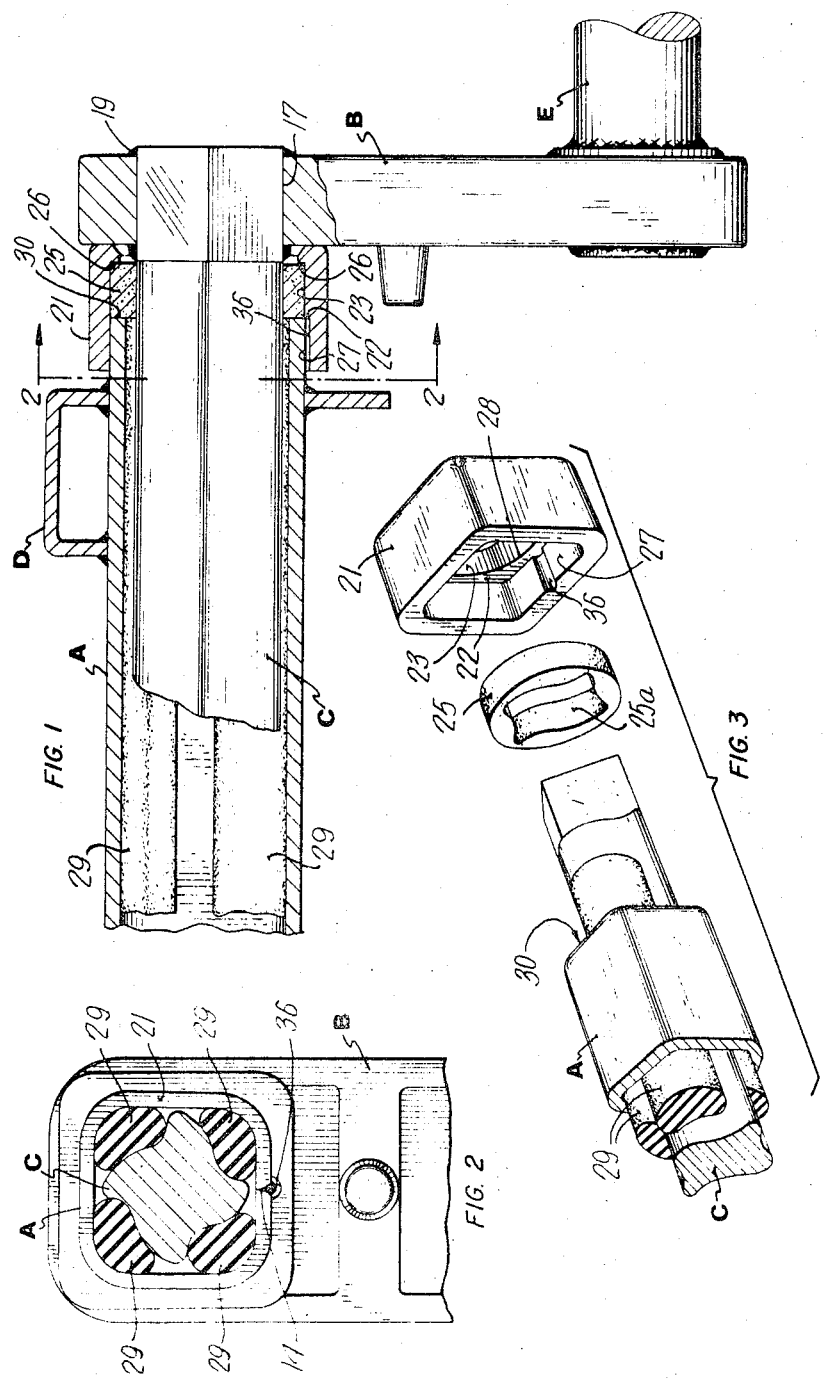

RESILIENT JOINT

BACKGROUND OF THE INVENTION

1. Field of the Invention

This invention relates to joints having relatively rotatable members with elastic elements acting between them as springs.

More specifically, the invention relates to a bearing arrangement for maintaining the rotatable members concentric to their common axis.

2. Description of the Prior Art

Joints of this general type are shown in U.S. Pat. Nos. 2,712,742 and 2,729,442, Neidhart, 1955 and 1956 respectively. The operation of this general type of joint is discussed in the Neidhart patents and other patents in this art.

One bearing arrangement is disclosed with special means for maintaining the inner and outer members concentric with respect to the common axis of rotation. This arrangement includes housing means in a torsion arm rigidly secured to the inner member for rotation with it relative to the outer member and, together with the outer member, defines a bearing recess about the outer member. A bearing element is disposed within the bearing recess to maintain the inner and outer members concentric with respect to the axis. This construction has the disadvantage that the recess for the bearing element is in the relatively heavy torsion arm of which the bearing assembly really forms a part. This makes the assembly difficult to put together.

SUMMARY OF THE INVENTION

It is an aim of the invention to provide a simpler structure for accomplishing similar results.

A joint according to the invention has the following features. It has the usual outer tubular member and an inner member of polygonal cross-section disposed generally concentrically within and spaced from the outer member for relative rotation therewith about a common axis. Restraining means are disposed, as in conventional structures, within the outer member and interacting between them and the inner member to effect resilient restraint against relative rotation of the outer and inner members about the common axis. The restraining means are usually resilient cushions of elastomeric material under compression between the inner and outer members. A bearing arrangement for maintaining the inner and outer members concentric with respect to the common axis of relative rotation includes rigid means, for example a torsion arm, secured to the inner member for rotation therewith relative to the outer member. The invention provides the following features. There is a bearing separate from the rigidly secured means, non-rotatably mounted on the inner member and rotatably engaging the outer member. Preferably, this separate means includes a bearing cup surrounding the inner member and bearing against the rigid means, for example the torsion arm. The bearing cup is provided with a bore having an inner cylindrical pocket and an adjoining polygonal socket shaped to receive the end of the outer member and a retaining shoulder between the pocket and socket. A bearing ring is rotatably held within the pocket and has a polygonal opening surrounding the inner member and keying it non-rotatably thereto. The end of the outer member is non-rotatably held within the socket and is against the adjoining shoulder.

This construction is specially advantageous for assembly purposes. The end of the inner member is first rigidly secured to a member adapted to rotate with it, for example a torsion arm. Then, the bearing cup and ring is slid onto the inner member till it abuts the rigidly secured member. Then, the outer member and the resilient cushions, deformed and frozen to suitable shape, are slid onto the inner member until the end of the outer member enters the bore of the bearing cup and seats on the retaining shoulder. The rollers are then thawed out so that they form resilient cushions between the inner and outer members.

The cup is rotatably related to the bearing member and to the inner member. The cup is held from radial movement by the end of the outer member, but is free to rotate relative thereto and relative to the inner member.

BRIEF DESCRIPTION OF THE DRAWING

Having thus generally described the invention, it will be illustrated in more detail by reference to the accompanying drawings showing a preferred embodiment and in which:

FIG. 1 is a fragmentary vertical cross-section, partly in elevation, through a suspension according to the invention;

FIG. 2 is a vertical cross-section along the line 2—2 of FIG. 1;

FIG. 3 is an exploded view showing the parts in pre-assembly relationship.

DESCRIPTION OF THE PREFERRED EMBODIMENTS

The suspension shown is constructed as follows. A is an outer heavy steel housing tube of square cross-section adapted to be connected transversely and firmly to a vehicle body. The tube A may be made of sheet metal by forming and welding in a seam 14. B is a steel torsion arm rotatably connected to the tube A, and C is a steel shaft of the cross-section shown in FIG. 2, fixedly connected to the torsion arm B, as will be described. The suspension at one side of the vehicle has been shown. There is a similar suspension at the other side of the vehicle.

The end of the torsion arm B is provided with a socket opening 17 shaped to receive the end of the inner shaft C. The end of the shaft C is welded as at 19 to the torsion arm B. The shaft C extends through the tube A part way to the other side of the vehicle body (not shown) and there is a similar shaft connected to a similar torsion arm at the other side of the vehicle. A bracket D connects the tube A and the vehicle body.

Under compression between the shaft C and the tube A are four elongated cylindrical rubber rollers or cushions 29, one between each surface of the shaft C and the tube A. In operation, the rollers 29 act as the springing medium or resilient restraining means of the suspension.

An outer metal bearing cup 21 surrounds the shaft C and abuts the torsion arm B. The cup 21 has a bore formed with a cylindrical pocket 23 provided with a seat 26. The pocket 23 receives a bearing ring 25, preferably of nylon or other suitably slidable material, having a central opening 25a fitting the shaft C. The bore of the cup 21 has an outer square bore or socket 27 which receives the end of the tube A so that its end face 30 abuts face 22 of the bearing cup 21. There is a shoulder 22 between the socket 27 and pocket 23. A groove 36 is provided to accommodate the weld 14.

Materials from which the various parts of the joint are made will be well understood by those skilled in the art. The resilient rollers are, for example made of an elastomeric material having the necessary resilience and strength, preferably natural rubber of the required properties. The ring 25 can be of any material having the necessary strength and the coefficient to friction effective to allow it to slide within the pocket 23 of the cup 21. Nylon is a preferred material.

The bearing, made up of the ring 25 and cup 21, gives support to the end of the tube A and prevents the shaft C from moving away from its coaxial position within the tube A. Since the opening in the ring 25 is shaped to correspond to the outside of the shaft C, when the shaft C rotates, the ring 25 also rotates. The inside configuration of the cup 21, for part of its length (socket 27) is shaped to fit closely over the outside of the tube A. The cup 21 at its mid-section is circular in shape (pocket 23) and of a size to fit closely over the ring 25, while still allowing sufficient clearance for free rotation between these parts. The end of the bearing cup 21 adjacent to the torsion arm B has an opening 28, bordering the shoulder 26 large enough to give clearance for the shaft C to pass through it and to allow it to rotate. The shoulder 26 restricts axial movement of the ring 25 towards the torsion arm B.

A feature of the invention is ease of assembly. The parts, making up the bearing, are freely assembled to the shaft C and require no welding or attachment to any other part of the assembly.

In assembly, the shaft C and torsion arm B are solidly welded together. Then, the bearing cup 21 is placed over the inner end of the shaft C and moved along it to a position at the back face of the torsion arm B. The ring 25 is then placed over the end of the shaft C and slid down until seated in the pocket 23 of and against the seating shoulder 26. The rubber rollers 29, which have been frozen to appropriately deform shape, are then placed over the shaft C and inserted between it and the tube A, and the end of outer tube A inserted into the socket 27, until the end face of the tube A makes contact with the shoulder 22.

Once the rollers 29 have thawed out and returned to their normal resilient condition, the shaft C is restrained from axial movement by the precompression and friction of the rubber rollers 29. The bearing member 25 is also restrained from axial movement by the retaining shoulder 26 on the one side and the end face of the tube A on the other.

When employed as a torsional vehicle suspension, a wheel spindle E is solidly welded to the lower end of the torsion arm B and the housing tube A rigidly attached to the vehicle frame through the bracket D.

Loading on the vehicle creates a combination of forces along the shaft C. Torsional forces are transferred to the rubber rollers 29 which compress and roll to allow elastically restrained rotation of the shaft C. This action provides the shock-absorbing suspension of the vehicle. Radial forces, however, acting on the shaft C tend to move it upwards and away from its coaxial position within the housing. This upward motion is transferred to the top of the bearing member 25 and from there to retainer cup 21. The cup 21 is incapable of moving upwards since its bottom edge is in contact with the end of the tube A. Potential radial forces are thereby taken off the top rubber rollers 29, which would otherwise have to absorb them and supported at the bottom edge of the tube A, effectively maintaining the co-axial position of both the shaft C and tube A.

The disposal of radial forces as described is important since loss of coaxiality of the shaft C or tube A causes uneven loading of the rollers 29. In the case of a cam shaped shaft C, which has less compression on the rollers 29, the vertical forces could even be sufficient to cause the shaft C to move upwards to the exent that it would make contact with the inside top face of the tube A and thereby restrict normal torsional rotation of the suspension. This is prevented by the action of the bearing of the invention.

We claim:

1. An elastic joint, comprising, an outer tubular member of polygonal cross-section,
    an inner member of polygonal cross-section disposed generally concentrically within and spaced from the outer member for rotation relative thereto about a common axis,
    means disposed within the outer member and interacting between it and the inner member to effect resilient restraint against relative rotation of the outer and inner members about the common axis,
    means rigidly secured to said inner member for rotation therewith relative to the outer member,
    and bearing means separate and unattached from said rigidly secured means and non-rotatably mounted on said outer member connecting said inner and outer members in relative rotational relationship while maintaining their coaxial alignment.

2. An elastic joint, as defined in claim 1, in which said bearing means includes a bearing cup separate from and bearing against said rigidly secured means,
    said cup being provided with an inner cylindrical pocket rotatably containing a ring having a polygonal bore fitting about said inner member to maintain it non-rotational therein, and an outer bore receiving the end of said outer member to maintain it non-rotation therein.

3. An elastic joint, as defined in claim 2, wherein said cup is provided with a shoulder surrounding the pocket to seat the ring against axial movement.

4. A bearing cup for an elastic joint having an inner member of polygonal cross-section rigidly connected to a member for rotation therewith and an outer tubular member of polygonal cross-section surrounding the inner member for rotation relative thereto with a number of cushions of elastomeric material between the inner and outer members to resiliently restrain rotational movement between them, said cushions maintaining the axis of the inner and outer members concentric,
    said cup having a metal body provided with a base and a bore formed with a base pocket terminating in a shoulder surrounding an opening in the base and a socket extending from said pocket and a shoulder between the pocket and the socket,
    the pocket being cylindrically shaped to receive rotationally a ring non-rotationally surrounding the inner member and to hold it in axially concentric relationship to the outer member,
    the socket being polygonally shaped to receive the end of the outer tubular member.

5. A method of assembling an elastic joint having an inner member of polygonal cross-section rigidly connected to a member for rotation therewith and an outer tubular member of polygonal cross-section surrounding the inner member for rotation relative thereto with a number of cushions of elastomeric material between the inner and outer members to resiliently restrain rotational movement between them, and means for maintaining the axis of the inner and outer members concentric, comprising, sliding onto said inner member a bearing cup rotatably containing a ring having a polygonal bore fitting about the inner member to maintain it in non-rotational relationship to the inner member and having a socket for receiving the end of the outer member, placing axially onto the inner member the outer tubular member and placing the cushions of elastomeric material retained in a deformed shape between the inner member and the outer member until the end of the outer member is seated in the socket of the bearing cup and the bearing cup bears against the rigidly secured member, and releasing the elastomeric cushions to seek their normal resilient shape to retain the inner and outer members against relative axial movement but to permit limited resilient radial movement between them.

* * * * *